US011164267B2

(12) United States Patent
Singh et al.

(10) Patent No.: US 11,164,267 B2
(45) Date of Patent: Nov. 2, 2021

(54) USING BLOCKCHAIN TO SELECT ENERGY-GENERATING SOURCES

(71) Applicant: INTERNATIONAL BUSINESS MACHINES CORPORATION, Armonk, NY (US)

(72) Inventors: Deependra Kumar Singh, Nagar (IN); Abhay Patra, Pune (IN); Harish Bharti, Pune (IN); Rajesh Kumar Saxena, Thane East (IN)

(73) Assignee: International Business Machines Corporation, Armonk, NY (US)

( * ) Notice: Subject to any disclaimer, the term of this patent is extended or adjusted under 35 U.S.C. 154(b) by 100 days.

(21) Appl. No.: 16/803,326

(22) Filed: Feb. 27, 2020

(65) Prior Publication Data
US 2021/0272220 A1    Sep. 2, 2021

(51) Int. Cl.
*G06Q 50/06*    (2012.01)
*G06F 16/27*    (2019.01)
(Continued)

(52) U.S. Cl.
CPC ............. *G06Q 50/06* (2013.01); *G06F 16/27* (2019.01); *G06N 5/027* (2013.01); *G06N 5/04* (2013.01); *G06Q 10/06315* (2013.01)

(58) Field of Classification Search
CPC .... G06Q 50/06; G06Q 10/06315; G06N 5/04; G06F 16/27; H04L 9/0637
See application file for complete search history.

(56) References Cited

U.S. PATENT DOCUMENTS

| 7,406,364 B2 | 7/2008 | Andren |
| 2004/0128266 A1 | 7/2004 | Yellepeddy |
(Continued)

FOREIGN PATENT DOCUMENTS

| CN | 108306292 A | 7/2018 |
| EP | 1087211 A2 | 3/2001 |
| WO | 2015077378 A1 | 5/2015 |

OTHER PUBLICATIONS

Mell, Peter et al.; "The NIST Definition of Cloud Computing;" National Institute of Standards and Technology; Special Publication 800-145; Sep. 2011; 7 pages.
(Continued)

*Primary Examiner* — Mohammad Ali
*Assistant Examiner* — Vincent W Chang
(74) *Attorney, Agent, or Firm* — Schmeiser, Olsen & Watts; Michael A. Petrocelli

(57) ABSTRACT

A power-distribution routing system of a power-transmission company receives a request to route electrical power to users through a power-grid infrastructure during a specified future period of time. The system retrieves time-stamped blockchain data that identifies past fluctuations in energy demand, service agreements between energy companies, and energy-production and demand-fulfilment histories of energy-generating sources like power plants. The system also retrieves extrinsic contextual and socioeconomic data from online sources and various business applications. An artificially intelligent cognitive framework uses a sliding-frame mechanism to infer patterns in the rate of change of user demand during past time periods similar to the period specified by the request. The system ranks each source by its demonstrated ability to satisfy the patterns of demand in consideration of the contextual data. The system directs downstream components to route energy from a mix of the
(Continued)

highest-ranking suppliers through the grid during the specified time period.

20 Claims, 8 Drawing Sheets

(51) Int. Cl.
*G06N 5/02* (2006.01)
*G06N 5/04* (2006.01)
*G06Q 10/06* (2012.01)

(56) References Cited

U.S. PATENT DOCUMENTS

| | | |
|---|---|---|
| 2010/0306002 A1 | 12/2010 | Dias |
| 2015/0088595 A1 | 3/2015 | Chillar |
| 2016/0063626 A1 | 3/2016 | Axelrod |
| 2017/0206522 A1* | 7/2017 | Schiatti ............. G06Q 50/06 |
| 2017/0232300 A1 | 8/2017 | Tran |
| 2017/0358041 A1* | 12/2017 | Forbes, Jr. ......... G06Q 10/00 |
| 2018/0114167 A1* | 4/2018 | Bharti ............... G06Q 30/08 |
| 2018/0182048 A1* | 6/2018 | Stocker ............. G06Q 20/223 |
| 2019/0165931 A1 | 5/2019 | Bharti |
| 2021/0158236 A1* | 5/2021 | Bikumala ........... G06K 9/6278 |

OTHER PUBLICATIONS

Hasse, Felix et al.; Blockchain—An Opportunity for Energy Producers and Consumers?; https://www.pwc.fr/fr/assets/files/pdf/2016/12/blockchain_opportunity_for_energy_producers_and_consumers.pdf; retrieved from the Internet Jun. 21, 2017; 46 pages.

The Future of Energy, LO3 Pando, Blockchain, Transactive Grids, Microgrids, Energy Trading, LO3 Tokens and Information, LO3 Energy; http://transactivegrid.net; retrieved from the Internet Jan. 3, 2017; 11 pages.

\* cited by examiner

| Time    | 1 | 2 | 3 | 4 | 5 | 6 | 7 | 8 | 9 | 10 | 11 | 12 | 13 | 14 |
|---------|---|---|---|---|---|---|---|---|---|----|----|----|----|----|
| Slide 1 |   | 3 | 4 | 7 | 3 | 4 | 7 | 3 | 4 | 7  | 4  | 4  | 4  | 4  |
| Slide 2 |   | 3 | 4 | 7 | 3 | 4 | 7 | 3 | 4 | 7  | 4  | 4  | 4  | 4  |
| Slide 3 |   | 3 | 4 | 7 | 3 | 4 | 7 | 3 | 4 | 7  | 4  | 4  | 4  | 4  |
| Slide 4 |   | 3 | 4 | 7 | 3 | 4 | 7 | 3 | 4 | 7  | 4  | 4  | 4  | 4  |
| Slide 5 |   | 3 | 4 | 7 | 3 | 4 | 7 | 3 | 4 | 7  | 4  | 4  | 4  | 4  |
| Slide 6 |   | 3 | 4 | 7 | 3 | 4 | 7 | 3 | 4 | 7  | 4  | 4  | 4  | 4  |
| Slide 7 |   | 3 | 4 | 7 | 3 | 4 | 7 | 3 | 4 | 7  | 4  | 4  | 4  | 4  |
| Slide 8 |   | 3 | 4 | 7 | 3 | 4 | 7 | 3 | 4 | 7  | 4  | 4  | 4  | 4  |
| Slide 9 |   | 3 | 4 | 7 | 3 | 4 | 7 | 3 | 4 | 7  | 4  | 4  | 4  | 4  |
| Slide 10|   | 3 | 4 | 7 | 3 | 4 | 7 | 3 | 4 | 7  | 4  | 4  | 4  | 4  |
| Slide 11|   | 3 | 4 | 7 | 3 | 4 | 7 | 3 | 4 | 7  | 4  | 4  | 4  | 4  |
| Slide 12|   | 3 | 4 | 7 | 3 | 4 | 7 | 3 | 4 | 7  | 4  | 4  | 4  | 4  |
| Slide 13|   | 3 | 4 | 7 | 3 | 4 | 7 | 3 | 4 | 7  | 4  | 4  | 4  | 4  |
| Slide 14|   | 3 | 4 | 7 | 3 | 4 | 7 | 3 | 4 | 7  | 4  | 4  | 4  | 4  |

FIG. 8A

| Time    | 1 | 2 | 3 | 4 | 5 | 6 | 7 | 8 | 9 | 10 | 11 | 12 | 13 | 14 |
|---------|---|---|---|---|---|---|---|---|---|----|----|----|----|----|
| Slide 1 |   | 3 | 4 | 7 | 3 | 4 | 7 | 3 | 4 | 7  | 4  | 4  | 4  | 4  |
| Slide 2 |   | 3 | 4 | 7 | 3 | 4 | 7 | 3 | 4 | 7  | 4  | 4  | 4  | 4  |
| Slide 3 |   | 3 | 4 | 7 | 3 | 4 | 7 | 3 | 4 | 7  | 4  | 4  | 4  | 4  |
| Slide 4 |   | 3 | 4 | 7 | 3 | 4 | 7 | 3 | 4 | 7  | 4  | 4  | 4  | 4  |
| Slide 5 |   | 3 | 4 | 7 | 3 | 4 | 7 | 3 | 4 | 7  | 4  | 4  | 4  | 4  |
| Slide 6 |   | 3 | 4 | 7 | 3 | 4 | 7 | 3 | 4 | 7  | 4  | 4  | 4  | 4  |
| Slide 7 |   | 3 | 4 | 7 | 3 | 4 | 7 | 3 | 4 | 7  | 4  | 4  | 4  | 4  |
| Slide 8 |   | 3 | 4 | 7 | 3 | 4 | 7 | 3 | 4 | 7  | 4  | 4  | 4  | 4  |
| Slide 9 |   | 3 | 4 | 7 | 3 | 4 | 7 | 3 | 4 | 7  | 4  | 4  | 4  | 4  |
| Slide 10|   | 3 | 4 | 7 | 3 | 4 | 7 | 3 | 4 | 7  | 4  | 4  | 4  | 4  |
| Slide 11|   | 3 | 4 | 7 | 3 | 4 | 7 | 3 | 4 | 7  | 4  | 4  | 4  | 4  |
| Slide 12|   | 3 | 4 | 7 | 3 | 4 | 7 | 3 | 4 | 7  | 4  | 4  | 4  | 4  |
| Slide 13|   | 3 | 4 | 7 | 3 | 4 | 7 | 3 | 4 | 7  | 4  | 4  | 4  | 4  |
| Slide 14|   | 3 | 4 | 7 | 3 | 4 | 7 | 3 | 4 | 7  | 4  | 4  | 4  | 4  |

FIG. 8B

USING BLOCKCHAIN TO SELECT ENERGY-GENERATING SOURCES

BACKGROUND

The present invention relates in general to electrical-power distribution and in particular to selecting energy suppliers from which a power-transmission may route power to an energy utility.

Power-transmission companies direct power from high-voltage energy suppliers and generators, like power plants, to low-power distribution companies and energy utilities that deliver power directly to consumers. This requires transmission companies to match fluctuating energy demand with energy suppliers capable of providing sufficient power when it is needed, and of doing so cost-effectively and in compliance with acceptable contractual terms. This ability is especially important during peak periods, when demand remains high for a sustained duration of time, and burst demand periods characterized by a sudden spike in demand.

SUMMARY

Embodiments of the present invention comprise systems, methods, and computer program products for using blockchain to select energy-generating sources to produce energy in a power-grid infrastructure. A power-distribution routing system of a power-transmission company receives a requirement to route electrical power to users through the power-grid infrastructure during a specified period of time. The system retrieves several types of time-stamped blockchain blocks that identify records of past fluctuations in consumer demand for energy; service agreements between energy energy-generating plants, utilities, power transmission companies, and other energy companies; and energy-production and demand-fulfilment records of power plants and other energy-generating sources of power. The system may also retrieve extrinsic contextual and socioeconomic data from any of a variety of online sources and business applications. An artificially intelligent cognitive framework uses a sliding-frame mechanism to infer patterns in the rate of change of user demand that occurred during time periods similar to the period specified by the request. Such similarities might include factors like a common time of day or day of the week. The system ranks each source by its demonstrated ability to satisfy the inferred patterns of demand, and these rankings may be adjusted as a function of context and other information mined from the contextual data. The system selects an optimal mix of suppliers that it deems to be most likely to be able to fulfill energy requirements necessary to satisfy the received requirement. The system then directs downstream components to route energy generated by the optimal mix of suppliers, during the specified time period, through the grid to a power utility or directly to consumers.

BRIEF DESCRIPTION OF THE DRAWINGS

FIG. 8A shows an example of a table or matrix of delta values onto which a table of sliding frames may be overlaid.

FIG. 8B shows the exemplary table or matrix of FIG. 8A onto which a table of sliding frames has be overlaid.

DETAILED DESCRIPTION

Figure 1:
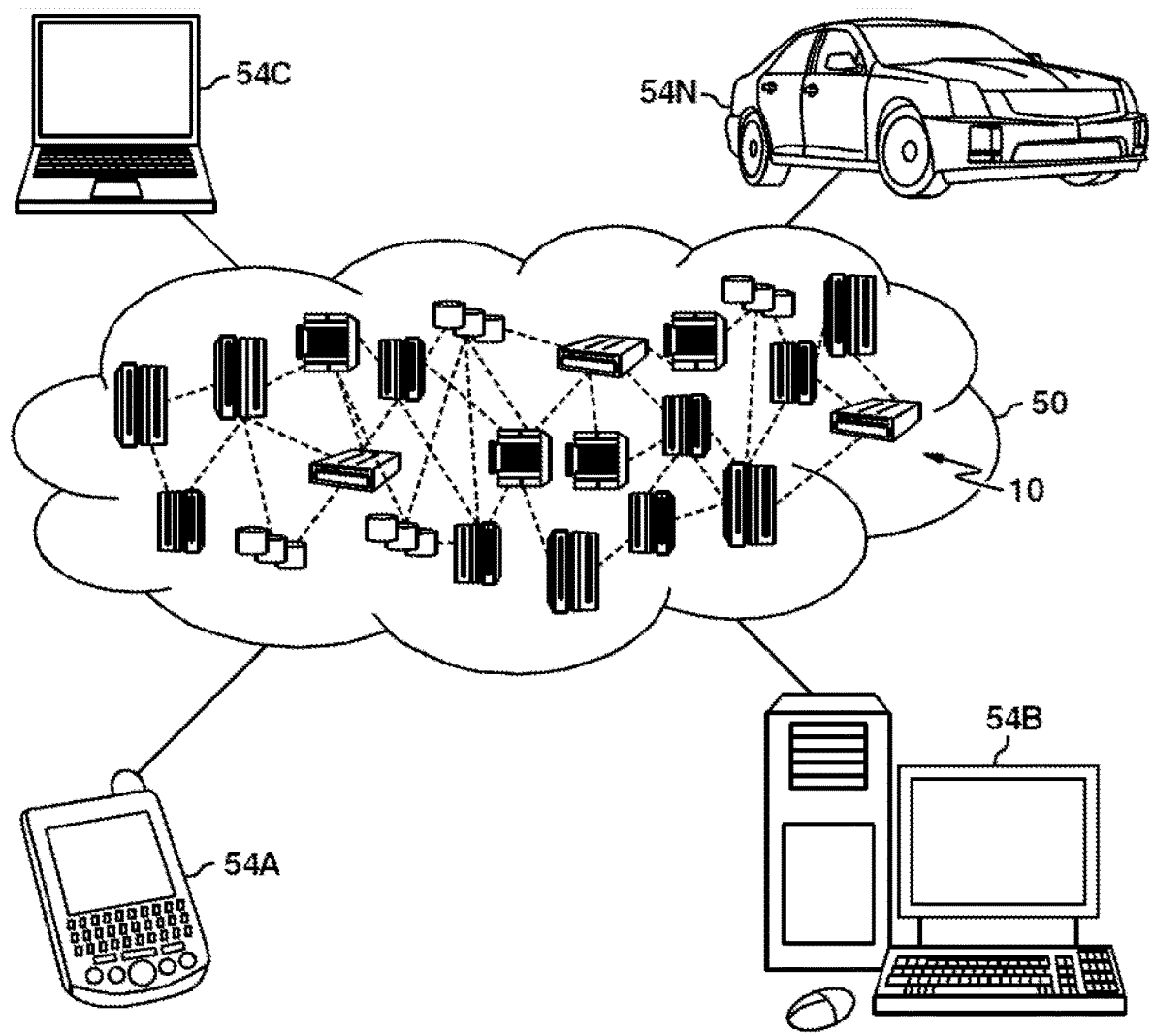
FIG. 1 depicts a cloud computing environment according to an embodiment of the present invention.

The energy-industry supply chain includes power-generation companies (referred to in this document as "suppliers"), power-transmission companies, power utilities, and other entities that together deliver electrical power to consumers. Power-transmission companies route electrical power from suppliers, such as coal-burning or hydroelectric power plants, to power utilities that in turn deliver the forwarded power to consumers. Because both consumer demand and the power-generating capacity of each supplier fluctuate over time, this infrastructure requires a power-transmission company to continually evaluate and select suppliers capable of cost-effectively generating power sufficient to satisfy expected demand.

A complex array of time-varying, and sometimes interdependent, factors influence consumer demand, supplier capacity, and energy costs. High demand during peak power-consumption periods can greatly exceed average power consumption, and sometimes-unpredictable bursts of demand can briefly exceed even peak levels.

A power-transmission company may require days or weeks to select an external supplier able to satisfy such demands and to then begin routing power generated by that supplier. It is thus important for power-transmission companies to employ distribution systems, infrastructures, or procedures capable of accurately matching time-varying consumer demand with supplier capacity. Existing systems can't always predict future demand and supplier power-generating capacities and may even require human intervention to determine which supplier would be most cost-effective at a particular time. Accordingly, existing power-transmission companies cannot guarantee that sufficient power will always be available to meet consumer needs and are generally unable to identify which suppliers are best able to cost-effectively satisfy peak or burst demand under the most desirable contractual terms.

The energy industry in recent years has begun using blockchain mechanisms to record and manage these and other types of transactions between power utilities, power-transmission companies, and power-generating energy suppliers. As is known in the art, blockchain is a decentralized, distributed data structure from which may be built virtually tamperproof digital ledgers. A record of information may be added to a blockchain, by any qualified peer, as an encrypted, time-stamped block. Once stored on a chain of a blockchain, a block cannot be altered by any party without detection, providing a high level of security in even a public distributed computing environment.

Such blockchains may be used to implement a decentralized energy transaction and supply system that makes distributed, secure transaction records accessible to all parties through a peer-to-peer network. Energy companies, including power-transmission companies, may also use blockchains to store information about energy suppliers, contractual terms of agreements between energy companies, details of regulatory reports, a supplier's time-varying production capacity, time-varying customer energy requirements, records of a supplier's past ability to fulfill consumer demands, and a supplier's pricing structure, rates, and fees.

Embodiments of the present invention comprise improved power-transmission management methods, systems, and computer program products that mine information stored in such blockchains by using an artificially intelligent or cognitive technology that infers patterns and semantic meaning to the stored records. This information is integrated with data points retrieved from grid-operations records and workforce-management applications, all of which may also be recorded on blockchain, and is then correlated with energy-demand forecasts based on patterns of previous demand and on socioeconomic factors. Such embodiments use these inferences and mined data to generate a model that compares each supplier's time-varying energy-production capacity to corresponding time-dependent levels of consumer demand. This model can then select one or more preferred suppliers from which to purchase energy at any particular future time, based on that supplier's concurrent pricing, terms, and ability to satisfy projected demand.

Embodiments use an artificially intelligent analytics framework, incorporating a "sliding-frame" methodology, to draw inferences from such models, to score and rank energy suppliers, and to perform a sensitivity analysis that optimizes each candidate supplier's reliability characteristics and energy cost. The result is an optimized "supplier mix" list of energy suppliers most likely to cost-effectively satisfy even peak and burst energy requirements during a target period of time. The power-transmission system uses this list to schedule suppliers such that the transmission company will be ready to cost-effectively access and deliver sufficient power whenever that power is most likely to be needed.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
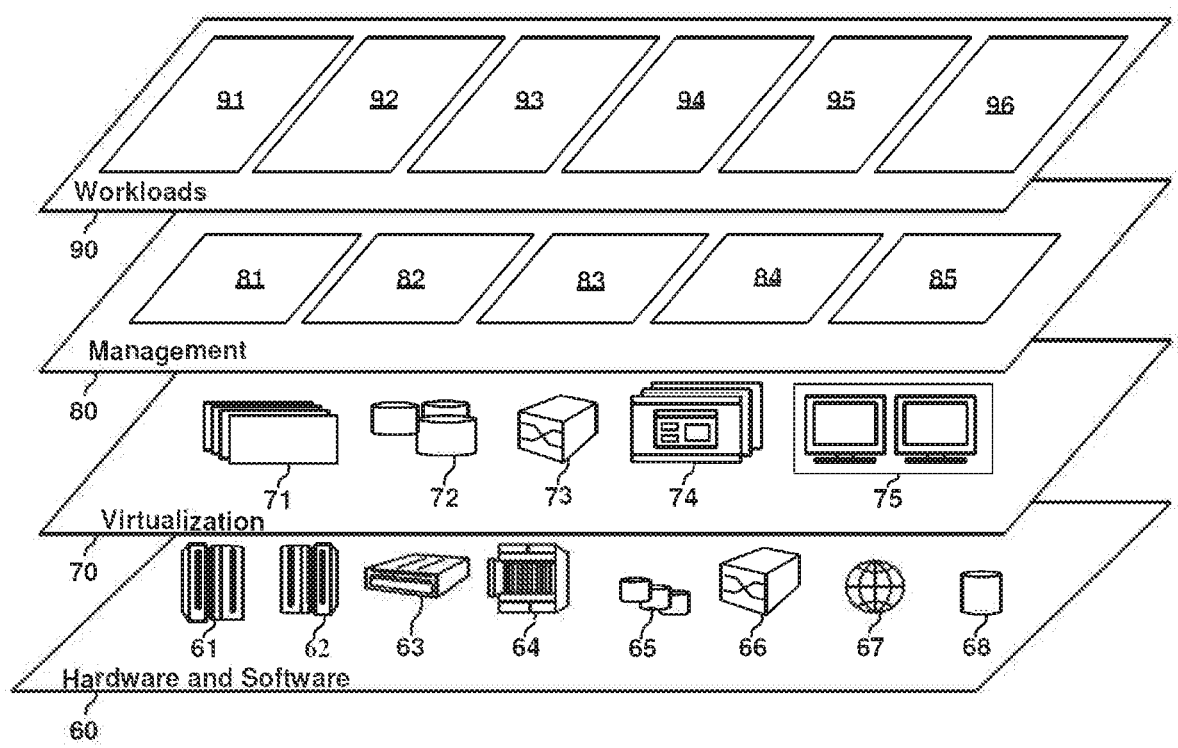
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and orchestration of complex methods 96 for using blockchain to select energy-generating sources.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 3:
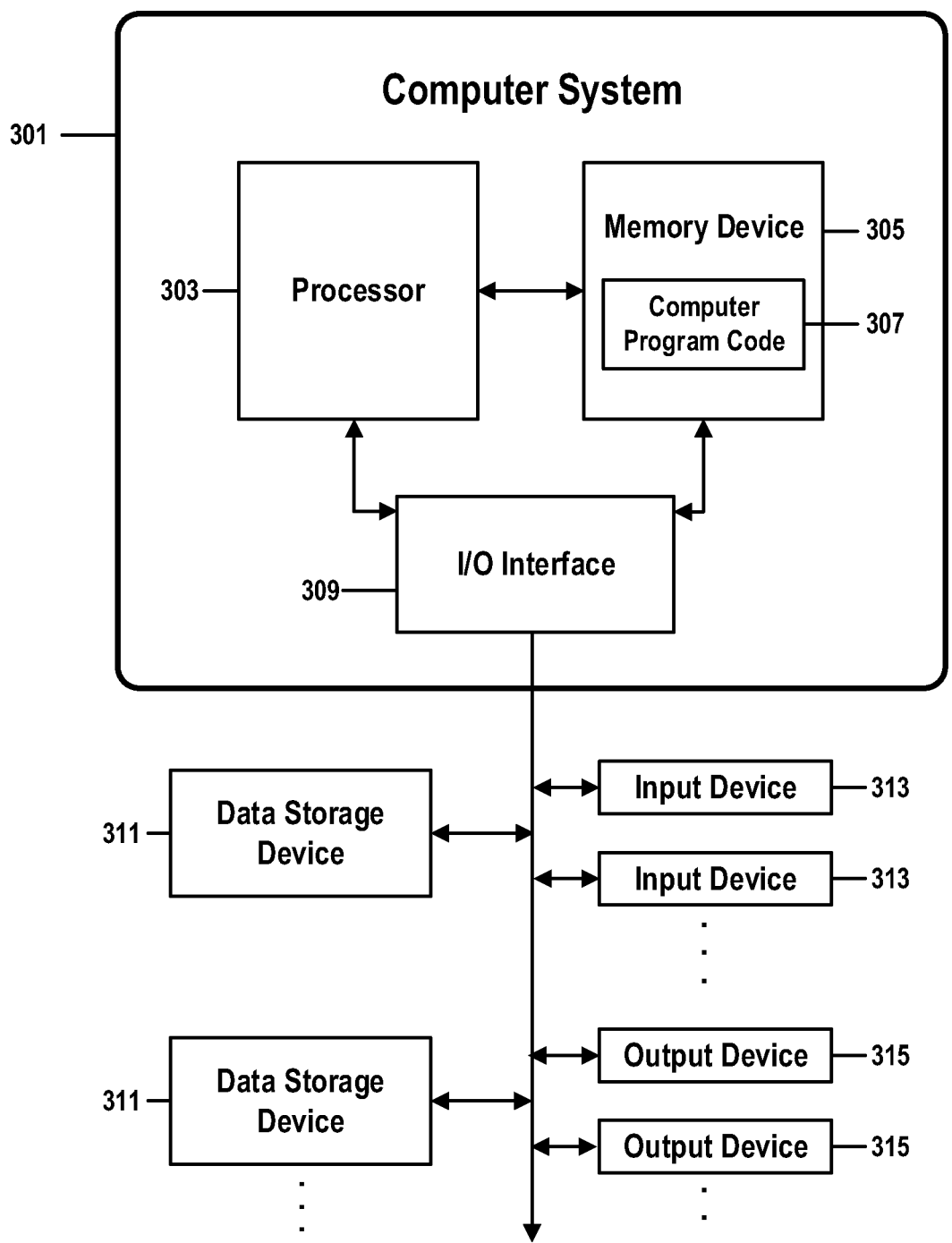
FIG. 3 shows the structure of a computer system and computer program code that may be used to implement a method for using blockchain to select energy-generating sources in accordance with embodiments of the present invention.

FIG. 3 shows a structure of a computer system and computer program code that may be used to implement a method for using blockchain to select energy-generating sources in accordance with embodiments of the present invention. FIG. 3 refers to objects 301-315.

In FIG. 3, computer system 301 comprises a processor 303 coupled through one or more I/O Interfaces 309 to one or more hardware data storage devices 311 and one or more I/O devices 313 and 315.

Hardware data storage devices 311 may include, but are not limited to, magnetic tape drives, fixed or removable hard disks, optical discs, storage-equipped mobile devices, and solid-state random-access or read-only storage devices. I/O devices may comprise, but are not limited to: input devices 313, such as keyboards, scanners, handheld telecommunications devices, touch-sensitive displays, tablets, biometric readers, joysticks, trackballs, or computer mice; and output devices 315, which may comprise, but are not limited to printers, plotters, tablets, mobile telephones, displays, or sound-producing devices. Data storage devices 311, input devices 313, and output devices 315 may be located either locally or at remote sites from which they are connected to I/O Interface 309 through a network interface.

Processor 303 may also be connected to one or more memory devices 305, which may include, but are not limited to, Dynamic RAM (DRAM), Static RAM (SRAM), Programmable Read-Only Memory (PROM), Field-Programmable Gate Arrays (FPGA), Secure Digital memory cards, SIM cards, or other types of memory devices.

At least one memory device 305 contains stored computer program code 307, which is a computer program that comprises computer-executable instructions. The stored computer program code includes a program that implements a method for using blockchain to select energy-generating sources in accordance with embodiments of the present invention, and may implement other embodiments described in this specification, including the methods illustrated in FIGS. 1-8B. The data storage devices 311 may store the computer program code 307. Computer program code 307 stored in the storage devices 311 is configured to be executed by processor 303 via the memory devices 305. Processor 303 executes the stored computer program code 307.

In some embodiments, rather than being stored and accessed from a hard drive, optical disc or other writeable, rewriteable, or removable hardware data-storage device 311, stored computer program code 307 may be stored on a static, nonremovable, read-only storage medium such as a Read-Only Memory (ROM) device 305, or may be accessed by processor 303 directly from such a static, nonremovable, read-only medium 305. Similarly, in some embodiments, stored computer program code 307 may be stored as computer-readable firmware, or may be accessed by processor 303 directly from such firmware, rather than from a more dynamic or removable hardware data-storage device 311, such as a hard drive or optical disc.

Thus the present invention discloses a process for supporting computer infrastructure, integrating, hosting, maintaining, and deploying computer-readable code into the computer system 301, wherein the code in combination with the computer system 301 is capable of performing a method for using blockchain to select energy-generating sources.

Any of the components of the present invention could be created, integrated, hosted, maintained, deployed, managed, serviced, supported, etc. by a service provider who offers to facilitate a method for using blockchain to select energy-generating sources. Thus the present invention discloses a process for deploying or integrating computing infrastructure, comprising integrating computer-readable code into the computer system 301, wherein the code in combination with the computer system 301 is capable of performing a method for using blockchain to select energy-generating sources.

One or more data storage devices 311 (or one or more additional memory devices not shown in FIG. 3) may be used as a computer-readable hardware storage device having a computer-readable program embodied therein and/or having other data stored therein, wherein the computer-readable program comprises stored computer program code 307. Generally, a computer program product (or, alternatively, an article of manufacture) of computer system 301 may comprise the computer-readable hardware storage device.

In embodiments that comprise components of a networked computing infrastructure, a cloud-computing environment, a client-server architecture, or other types of distributed platforms, functionality of the present invention may be implemented solely on a client or user device, may be implemented solely on a remote server or as a service of a cloud-computing platform, or may be split between local and remote components.

While it is understood that program code 307 for a method for using blockchain to select energy-generating sources may be deployed by manually loading the program code 307 directly into client, server, and proxy computers (not shown) by loading the program code 307 into a computer-readable storage medium (e.g., computer data storage device 311), program code 307 may also be automatically or semi-automatically deployed into computer system 301 by sending program code 307 to a central server (e.g., computer system 301) or to a group of central servers. Program code 307 may then be downloaded into client computers (not shown) that will execute program code 307.

Alternatively, program code 307 may be sent directly to the client computer via e-mail. Program code 307 may then either be detached to a directory on the client computer or loaded into a directory on the client computer by an e-mail option that selects a program that detaches program code 307 into the directory.

Another alternative is to send program code 307 directly to a directory on the client computer hard drive. If proxy servers are configured, the process selects the proxy server code, determines on which computers to place the proxy servers' code, transmits the proxy server code, and then installs the proxy server code on the proxy computer. Program code 307 is then transmitted to the proxy server and stored on the proxy server.

In one embodiment, program code 307 for a method for using blockchain to select energy-generating sources is integrated into a client, server and network environment by providing for program code 307 to coexist with software applications (not shown), operating systems (not shown) and network operating systems software (not shown) and then installing program code 307 on the clients and servers in the environment where program code 307 will function.

The first step of the aforementioned integration of code included in program code 307 is to identify any software on the clients and servers, including the network operating system (not shown), where program code 307 will be deployed that are required by program code 307 or that work in conjunction with program code 307. This identified software includes the network operating system, where the network operating system comprises software that enhances a basic operating system by adding networking features. Next, the software applications and version numbers are identified and compared to a list of software applications and correct version numbers that have been tested to work with program code 307. A software application that is missing or that does not match a correct version number is upgraded to the correct version.

A program instruction that passes parameters from program code 307 to a software application is checked to ensure that the instruction's parameter list matches a parameter list required by the program code 307. Conversely, a parameter passed by the software application to program code 307 is checked to ensure that the parameter matches a parameter required by program code 307. The client and server operating systems, including the network operating systems, are identified and compared to a list of operating systems, version numbers, and network software programs that have been tested to work with program code 307. An operating system, version number, or network software program that does not match an entry of the list of tested operating systems and version numbers is upgraded to the listed level on the client computers and upgraded to the listed level on the server computers.

After ensuring that the software, where program code 307 is to be deployed, is at a correct version level that has been tested to work with program code 307, the integration is completed by installing program code 307 on the clients and servers.

Embodiments of the present invention may be implemented as a method performed by a processor of a computer system, as a computer program product, as a computer system, or as a processor-performed process or service for supporting computer infrastructure.

Figure 4:
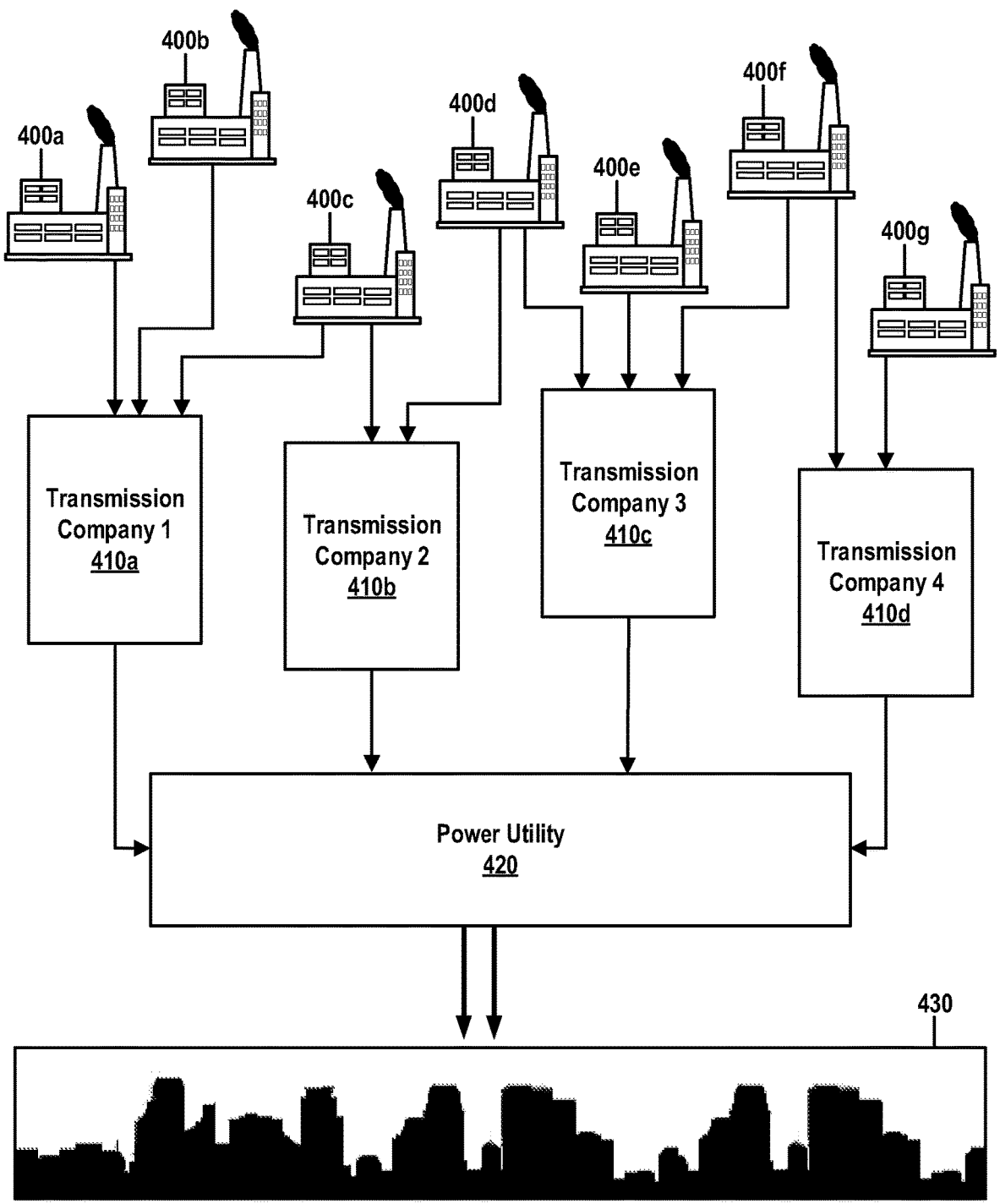
FIG. 4 shows an architecture of a power-distribution infrastructure that includes power-generating sources, power-transmission companies, an electrical utility, and energy consumers.

FIG. 4 shows an exemplary power-distribution infrastructure that illustrates connections between power-generating sources, power-transmission companies, an electrical utility, and energy consumers. FIG. 4 shows items 400a-400g, 410a-410d, 420, and 430.

In this figure, a power utility 420 delivers power to consumers 430. The utility 420 receives this power from one or more power-transmission companies 410a-410d. Each transmission company 410a-410d in turn receives power from one or more power-generating suppliers 400a-400g.

Figure 5:
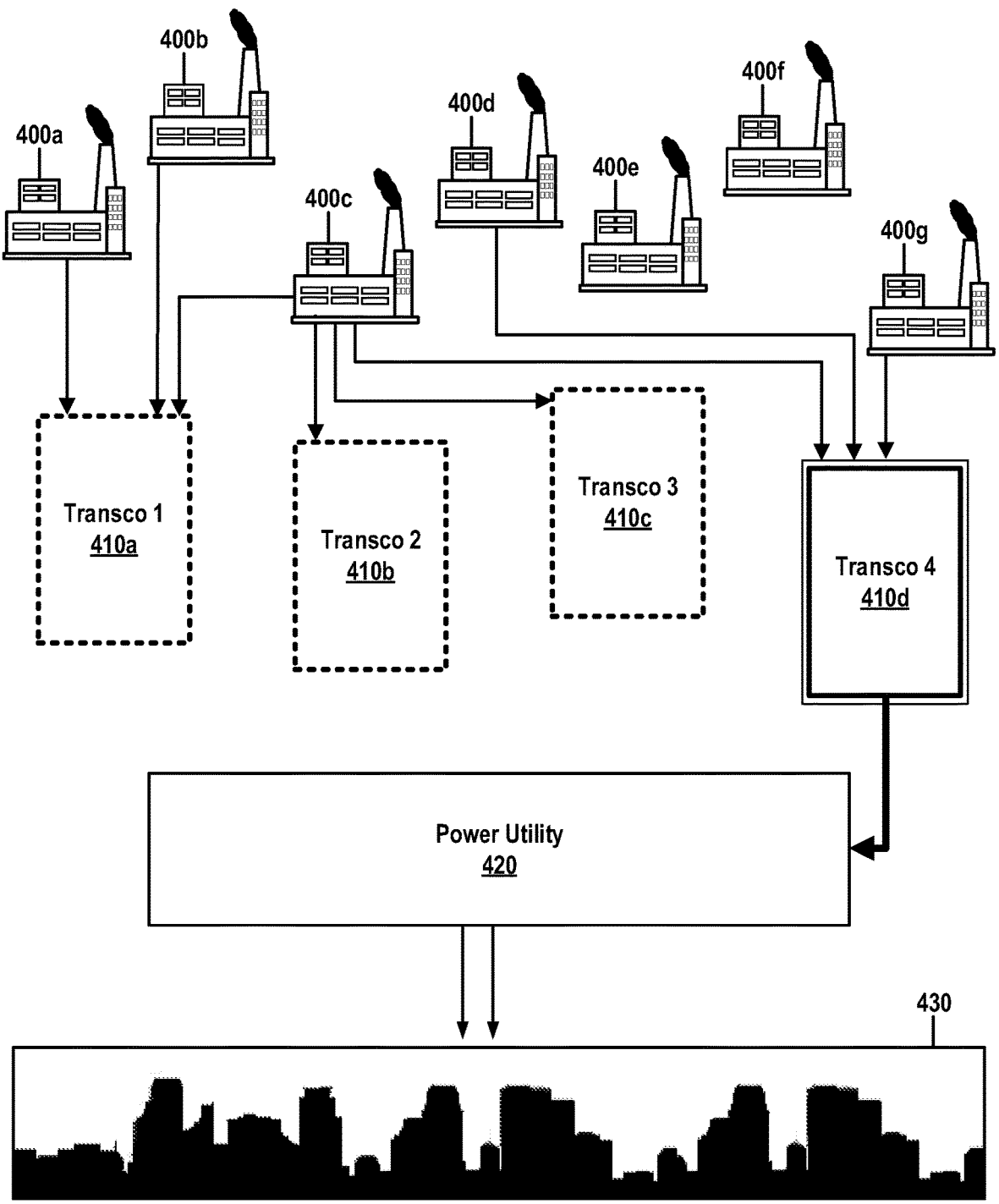
FIG. 5 shows illustrates a selection of a power-transmission company that routes power from a specific mix of suppliers.

Because the energy demands of consumers 430 vary over time, utility 420 may continuously reevaluate its choice of transmission companies 410a-410d in order to ensure that the utility 420 can provide power sufficient to cost-effectively meet demand at all times. Similarly, each transmission company 410a-410d may continuously reevaluate its choice of power suppliers 400a-400g in order to ensure that the transmission company 410a-410d is able to cost-effectively provide power sufficient to meet the utility 420's demand at all times FIG. 5 shows illustrates a selection of a transmission company that routes power from a specific mix of suppliers. FIG. 5 shows items 400a-400g, 410a-410d, 420, and 430, each of which is similar in form and function to identically numbered items of FIG. 4.

FIG. 5 illustrates a typical real-world topology of a power-distribution network in operation. FIG. 5 is based on the infrastructure shown in FIG. 4.

In FIG. 5, power utility 420 has chosen to receive power from power-transmission company 4 410d. Transmission company 4 410d has in turn chosen to route power from two power suppliers 400f and 400g. In existing power-distribution networks, the power utility 420's choice of power-transmission company 410*d* and suppliers 400*f* and 400*g* may be selected manually, randomly, or based on simple, arbitrary criteria. In embodiments of the present invention, they are instead selected by a cognitive, artificially intelligent mechanism based in part on data stored in a blockchain-based ledger accessible by suppliers 400*a*-400*g*, transmission companies 410*a*-410*d*, and the utility 420 shown in FIG. 5.

Although FIG. 5 shows power-transmission company 4 410*d* routing power to power utility 420, which in turn delivers power to consumers 430, it is also possible for power-transmission company 4 410 to distribute power directly to consumers 430. In this latter case, the distribution to consumers 430 would be monitored and billed by power utility 430. Because embodiments of the present invention manage the interface between power-transmission companies 410*a*-410*d* and power suppliers 400*a* and 400*g*, the details of the interface between power-transmission companies 410*a*-410*d*, power utility 420, and consumers 430 may not be significantly affected by implementation of the present invention.

Figure 6:
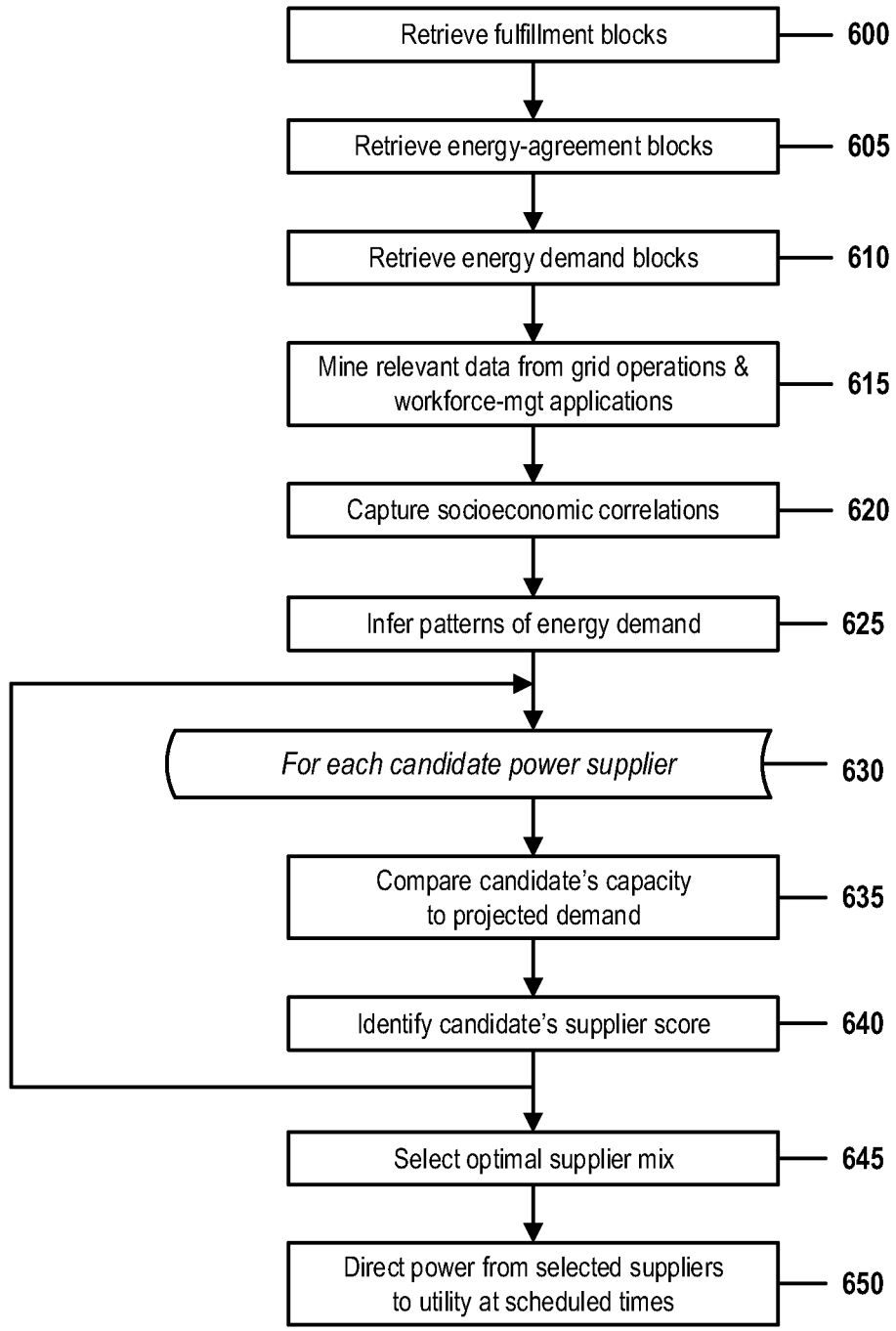
FIG. 6 is a flow chart that illustrates steps of a method for using blockchain to select energy-generating sources in accordance with embodiments of the present invention.

FIG. 6 is a flow chart that illustrates high-level steps of a method for using blockchain to select energy-generating sources in accordance with embodiments of the present invention. FIG. 6 shows steps 600-650.

In step 600, a component, system, or subsystem (henceforth, the "system") of an application associated with power-transmission company 410*d* responds to notice that a power utility 420 will need to provide power to consumers 430 at a particular future time. This request for power may be identified or received by any means known in the art. In some cases, transmission company 410 may already be aware that utility 420 has a previously scheduled or recurring power requirement defined by an existing relationship between transmission company 410*d* and utility 420. Continuing the examples of FIGS. 4 and 5, transmission company has access to power generated by any combination of suppliers 400*a*-400*g*.

Methods and examples of FIG. 6 focus on transmission company 410*d* for pedagogical reasons and these references should not be construed to constrain embodiments of the invention to a particular transmission company. In the examples of FIGS. 4 and 5, the method of FIG. 6 could be implemented just as effectively for any of the transmission companies 410*a*-410*d*.

The system retrieves or receives this information as archival records or logs of past energy demands by consumers of utility 420. This information may be received by any means known in the art, such as by receiving service logs provided by utility 420, by retrieving publicly available information about consumer power utilization, or by scanning information entered into blocks of a blockchain associated with the utility 420 or transmission company 410*d*.

In embodiments and examples of FIG. 6, transmission company 410*d* responds to receipt of the notice in steps 600-620 by mining the blockchain for information contained in several types of time-stamped blocks and then retrieving contextual information from extrinsic sources. In some embodiments, each type of block is stored in a distinct chain of a master energy blockchain, but in others, two or more types of blocks may be combined in a single chain.

The system in step 600 first retrieves "fulfilment" blocks from the blockchain. These blocks each record the successful fulfilment of an energy-supply requirement by a particular supplier during a specific period of time.

For example, if fulfilment blocks are recorded at ten-minute intervals, a first fulfilment block could record that a requirement for 500 kilowatts of power from 6:00 PM to 6:10 PM on Feb. 24, 2019 was fulfilled by a supplier 400*a*. In other cases, depending on requirements specific to the associated energy-supply infrastructure, fulfilment blocks may each span a different duration of time, such as a 30-minute or a 60-minute period.

Fulfilment blocks are selected as a function of the future time specified in the previously received notice. For example, if power requirements are known to fluctuate as a function of time of day, a notice that power will be required from 10:00 AM through Noon on a particular day could result in the system retrieving fulfilment blocks that spanned the same time period on previous days. If demand is known to also vary as a function of the day of the week, a notice that power will be required from 10:00 AM through Noon on every day from next Thursday through next Sunday, then the system would retrieve fulfilment blocks that spanned the period 10:00 AM through Noon on previous Thursdays, Fridays, Saturdays, and Sundays. If demand is expected to vary as a function of season or month of the year, the set of retrieved fulfilment blocks would be further filtered to include only blocks time-stamped during the particular month or months specified by the received notice.

Related blocks of the blockchain may also record transaction details that identify results of a supplier's attempt to fulfil an energy "request" transaction.

In some embodiments, fulfilment blocks predominantly or solely store data characterizing an energy-generating supplier's production capacity during a time period identified by a block's time-stamp.

In step 605, the system, in response to receiving the notice, retrieves "agreement" blocks from the blockchain. These agreement blocks identify terms and conditions of agreements or contracts between a transmission company 410*a*-410*d*, an energy supplier 400*a*-400*g*, a power utility 420, or energy consumers 430.

The system in this step selects only those blocks that reference agreements between entities within the scope of a candidate infrastructure capable of power request received in step 500. For example, in the highlighted infrastructure of FIG. 5, the system would retrieve agreement blocks that referenced contracts or service agreements between transmission company 410*d*, suppliers 400*c*, 400*d*, and 400*g*, transmission company 410*d*, power utility 420, and energy consumers 430.

As in step 600, the system may in this step select blocks that have time stamps associated with the time periods specified by the notice received in step 600.

In step 610, the system, in response to receiving the notice, retrieves "energy demand" blocks from the blockchain. These time-stamped demand blocks record past levels of consumer energy demand during associated periods of time. In some embodiments the system may choose only those blocks that reference energy demands of consumers 430 that would be serviced by the power requested by the notice received in step 500.

As in step 600, the system may in this step select blocks that have time stamps associated with the time periods specified by the notice received in steps 600 and 605.

In step 615, the system retrieves a first set of additional data from records of grid operations and from asset-management and workforce-management applications and systems. This additional data may provide context that facilitates the inference of patterns from blockchain records retrieved in steps 600-610. In some embodiments, this additional data may be retrieved from a blockchain, such as a blockchain from which blocks are retrieved in steps 600-610.

In one example, the system would retrieve grid-operations data from which patterns of energy demand may be refined. In this example, if demand during a particular one-day period reveals a pattern of usage that is significantly lower than usage during previous similar periods, grid-operations data that identifies a widespread four-hour blackout could provide context for the lower usage figures. The system could then, using cognitive methods, infer that the anomalous demand identified by blockchain energy-demand records during that day should be discounted, due to the existence of an extrinsic condition, when attempting to identify recurring patterns of demand.

Similarly, in another example, information retrieved from asset-management and workforce-management systems could reveal extrinsic factors like scheduled maintenance events that temporarily take power-generating or power-distribution assets offline or workforce reconfigurations that temporarily affect the delivery of or demand for power.

In yet another example, records of a coal-burning supplier's production cycle could be used to identify patterns in the supplier's ability to generate power. In this example, initializing a new energy-production cycle, as is known in the industry, would result in an initial period of lower capacity while the coal is being heated, followed by fluctuations in capacity while the plant begins to convert the increasing heat into electrical power, and then finally a stable period of high capacity as the coal-burning process enters a steady state.

In some cases, a power plant may regularly schedule such cycles to occur at a recurring time, such as every Sunday evening at 10:00 PM. In such cases, the system might infer that a particular generation pattern characterized by the power plant's start-up procedure can be inferred to recur every Sunday at the same time.

Many other extrinsic events can be identified, characterized, or inferred from data retrieved in this step. Depending on implementation details, any of this information might aid a cognitive framework in generating inferences capable of allowing the system to more accurately predict a supplier's pattern of energy production or a pattern of user demand.

In step 620, the system collects socioeconomic data or other contextual data from any public, private, or proprietary source desired by an implementer. This contextual data may help the system better interpret information retrieved from other sources in steps 600-615.

For example, extrinsic data identifying national holidays could help the system's cognitive framework to better interpret seemingly anomalous demand, consumption, or supply figures during a time period that coincides with a holiday. Records retrieved from a weather service that identify record high temperatures or the occurrence of a blizzard on a particular day could help the system explain a period of burst demand on that day.

As in steps 600-610, the system may filter the information retrieved in step 615-620 such that the system retrieves only data that is relevant to entities and time periods related to the power requirement received in step 600.

In step 625, the system submits all or part of the data retrieved in steps 600-620 to a cognitive framework that uses methods of artificial intelligence, such as cognitive analytics or machine learning, to infer the existence of patterns in the energy usage or demand of consumers 430. The cognitive framework, or other module of the system, uses these patterns to predict energy demand during the period of time specified by the request for power received or identified in step 600.

In certain embodiments the cognitive framework is trained by methods of machine learning, which generate training corpora that record the relative success or failure of each cognitive decision or prediction made by the cognitive framework. In such embodiments, every performance of the methods of FIGS. 6 and 7 produces additional training material, enabling the cognitive framework, as well as other components of the system, to more accurately identify optimal energy suppliers capable of satisfying the received energy request.

Figure 7:
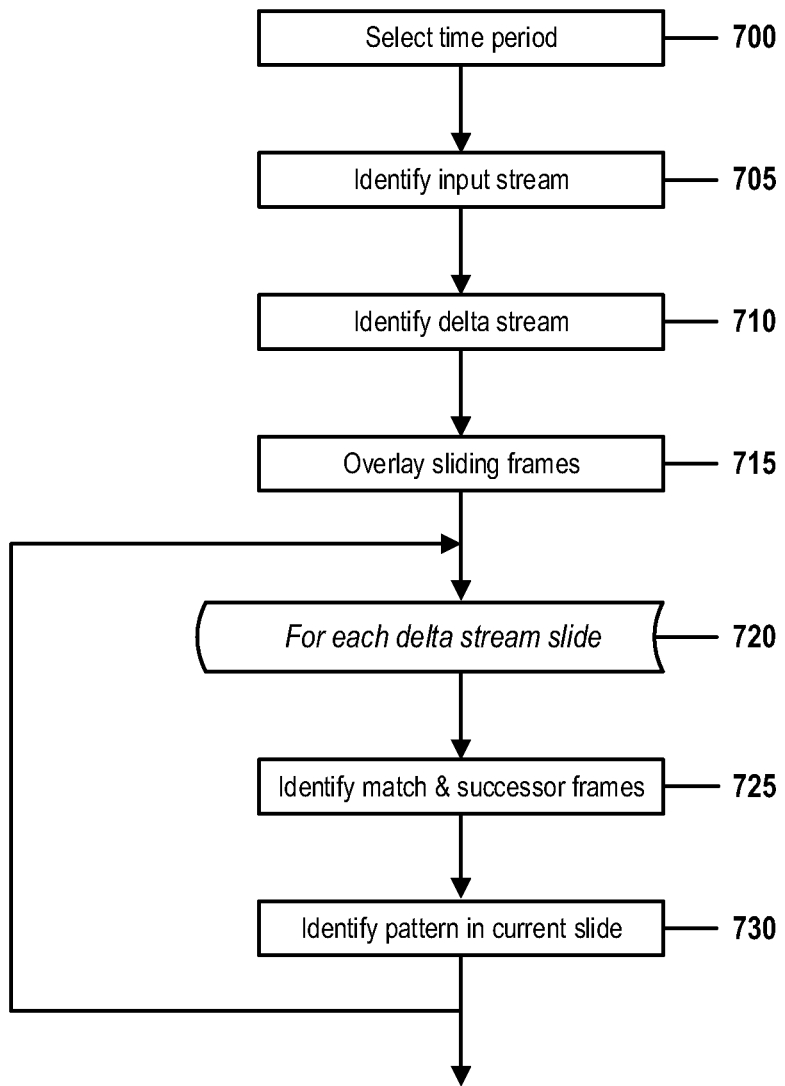
FIG. 7 is a flow chart that illustrates steps of a sliding-frame method for inferring patterns of consumer energy demand from retrieved blockchain data.

Details of step 625 are described in FIG. 7.

Step 630 begins an iterative procedure of steps 630-640, which is repeated once for each candidate energy supplier that is theoretically capable of being selected by the system to satisfy the power request received in step 600. Subsequent steps of the method of FIG. 6 will determine whether that supplier would be capable of meeting a set of predicted, time-varying energy demands occurring during the time period specified by the power request.

In step 635, the cognitive framework, or another module of the system, compares the candidate power supplier's ability to meet the energy demands predicted in step 625 to occur during the time periods identified by the request received in step 600.

The system makes this prediction by considering the candidate supplier's history of power-generation capacity mined from the fulfilment blocks retrieved in steps 600.

In one example, consider a request for power on a Tuesday morning from 8:00 AM through 1:00 PM. A pattern of demand identified in step 625 predicts that consumer demand on that day during those hours would be:

8:00 AM-9:00 AM: 1.0 megawatts
9:00 AM-10:00 AM: 1.2 megawatts
10:00 AM-11:00 AM: 1.0 megawatts
11:00 AM-12:00 PM: 1.2 megawatts
12:00 PM-1:00 PM: 2.5 megawatts As explained in FIG. 7, this demand pattern corresponds to a pattern of demand deltas that each specify a difference in demand between adjacent time periods. Here, that pattern would be: 0.2, 0, 0.2, 1.3. This pattern indicates that energy demands increased by 0.2 megawatts between the first two one-hour periods (that is, between the 8:00-9:00 AM period and the 9:00-10:00 AM period), did not increase during the next period (10:00-11:00 AM), increased by 0.2 megawatts during the 11:00 AM-12:00 PM period, and increased by 1.3 megawatts during the final 12:00 PM-1:00 PM period.

The system identifies, using data mined from the retrieved fulfilment blocks, the power-generating capacity that was available from the current candidate during each time period of previous occurrences of this delta pattern. If the fulfillment blocks indicate that the candidate had had sufficient capacity to meet the requirements during every period comprised by an occurrence of the pattern, then the candidate is considered to have been qualified to meet that particular occurrence of that pattern.

This procedure is repeated for each pattern of demand expected to occur during the duration of time specified by the received request.

In some embodiments, no attempt is made to predict the energy demands during the period of time specified by the received power request. Instead, a candidate supplier's output capacity is evaluated against occurrences of every demand pattern identified in step 625 and in FIG. 7. In either case, the system in this step evaluates the candidate supplier's ability to provide sufficient power to satisfy fluctuations in demand during normal, peak, and burst patterns of demand that occurred in the past.

In step 640, the system assigns a score to the candidate supplier, based on the comparisons performed in step 635. An implementer may use any desired scoring system that produces a score with which the system may rank candidate suppliers by their relative abilities to satisfy fluctuations in energy requirements identified by the delta patterns inferred in step 625 and FIG. 7.

For example, if four delta patterns and twelve occurrences of each pattern are identified in step 625 by processing data retrieved in steps 600-620, a candidate supplier might be assigned a score that is incremented once for every occurrence that the supplier was qualified to satisfy. In this example, if the candidate supplier had been able to provide sufficient power to satisfy three occurrences of the first pattern, one occurrence of the second pattern, twelve occurrences of the third pattern, and no occurrences of the fourth pattern, the candidate supplier would be assigned a score of 3+1+12+0=16.

In some embodiments, extrinsic considerations may also be considered during the comparison or scoring procedures of steps 635 and 640. For example, if a contractual term retrieved from an energy-agreement block retrieved in step 605 indicates that delivered power cannot fall below 118 volts AC, a comparison that would otherwise indicate that a candidate supplier had been qualified to meet a particular occurrence would not result in a score increment if the candidate supplier had not been able to meet this minimum-voltage requirement. Such a requirement, depending on details recorded in the agreement block, could be a requirement mandated by any combination of parties that have an interest in the requested delivery of power. These parties could include, for example, a utility 420, consumers 430, a transmission company 410a-410d, or even a power-generating supplier 400a-400g.

At the conclusion of the last iteration of steps 630-640, the system will have computed a score for each candidate supplier deemed to be potentially capable of satisfying the requirement for power received in step 600.

In step 645, the system selects the candidate supplier or suppliers that have the highest scores computed in iterations of step 640. In some cases, the system may select a combination or mix of suppliers. This may occur, for example, if an implementer wishes to apply additional criteria when choosing from a set of candidates that are all capable of satisfying the power request. Such criteria might include additional quality-of-service requirements or cost requirements, as identified by data retrieved in steps 600-620.

In other cases, a mix may be selected if it is determined that no single supplier is capable of delivering sufficient power during the occurrence of all delta patterns identified in step 625 and FIG. 7. In such cases, the system will in step 645 identify a set of candidate suppliers that together are able to meet the requirements of all identified patterns.

In step 650, the system, or some other application of transmission company 420d, directs the power-transmission infrastructure to route power from the selected supplier or supplier mix to the power utility at the time identified by the power request. Depending on implementation routing may pass the power through an subsidiary infrastructure of the transmission company 410d or may route the power directly from each selected supplier to the utility 420 or to the energy consumers 430.

FIG. 7 is a flow chart that illustrates steps of a sliding-frame method for inferring patterns of consumer energy demand from retrieved blockchain data. Steps 700-730 of FIG. 7 describe step 625 of FIG. 6 in greater detail.

In step 700, the system determines a time period of interest. This period may be determined by any means preferred by an implementer, and may be a function of implementation-dependent details, business goals, technical issues, or other factors within the expert knowledge of an implementer.

In one example, this time period is identified directly or indirectly by details of the power request received in step 600 of FIG. 6. Here, if the power request requires energy to be delivered throughout all 10-minute intervals between an upcoming Monday morning at 5:00 AM and the following Friday evening at 11:59 PM, the time period of interest would span a recent, or a most recent, period of time extending from a previous Monday morning at 5:00 AM through the next Friday evening at 11:59 PM. In such cases, the system would select a previous occurrence of the time period specified by the received request because consumer energy demand may be periodic, with patterns of demand recurring at the same time each day or on the same day of every week.

In other cases, if a time period requested by the received request falls on a holiday, such as a period spanning 5:00 PM through Midnight on New Year's Eve, the time period of interest might comprise all periods from 5:00 PM through Midnight on previous occurrences of New Year's Eve, regardless of the day of the week each previous New Year's Eve fell on.

In all these examples, the rules by which a time period specified by the received request helps determine the time period of interest are identified by an implementer's expert knowledge, or by inferences drawn by an expert-system, or other artificially intelligent or machine-trained, component of the system. These identified rules allow the system to determine which previous periods of time are most likely to comprise patterns of demand similar to the patterns expected to occur during the time period specified by the received request.

In step 705, the system enumerates an input stream that spans the time period of interest identified in step 700. This input stream lists the energy demand that occurred during each time slot of the time period of interest. As explained above, the level of energy demand during each time slot may be determined by records of past demand recorded from the time-stamped energy-demand blocks retrieved in step 610 of FIG. 6.

The duration of each time slot may be selected as a function of any parameter deemed relevant by an implementer. If, for example, fulfilment blocks of the block chain are recorded at one-hour intervals, the system may generate an input stream that identifies levels of demand at one-hour intervals. Or, if an implementer's expert knowledge suggests that energy demands can fluctuate significantly over the course of even one minute, an implementer may select a matching time-slot duration of one minute (assuming, of course, that the blockchain records entries with sufficient granularity).

In some embodiments, the time period of interest identified in step 700 may comprise multiple, noncontiguous time periods. For example, if an implementer wishes to take advantage of a deeper record of past demand, the system could be configured to respond to a power request on the next occurrence of a national holiday by generating a distinct input stream for each of the last three occurrences of that holiday. In other embodiments, these multiple input streams might instead, at an implementer's discretion, be concatenated into a single stream.

In the example of Table I, a period of interest lists past levels of demand during 14 time slots that each have a duration of 60 minutes. Here, energy demand is listed in row two of Table I, in units of megawatts. The information in this table shows that consumer demand during time slot 2 was 3 MW, demand during time slot 4 was 14 MW, and so forth.

TABLE I

Example of Time Slots, Input Stream, and Delta Stream

| | Time Slot | | | | | | | | | | | | | |
|---|---|---|---|---|---|---|---|---|---|---|---|---|---|---|
| | 1 | 2 | 3 | 4 | 5 | 6 | 7 | 8 | 9 | 10 | 11 | 12 | 13 | 14 |
| Demand | 0 | 3 | 7 | 14 | 17 | 21 | 28 | 31 | 35 | 42 | 46 | 50 | 54 | 58 |
| Demand Delta | | 3 | 4 | 7 | 3 | 4 | 7 | 3 | 4 | 7 | 4 | 4 | 4 | 4 |

In step 710, the system generates from the input stream a delta stream of values, each of which is assigned to one of the time slots. Each delta value identifies a change in a level of demand that occurs between the time of the current time slot and the time of the immediately preceding time slot.

This is illustrated by the third row of Table I. In this example, time slot 2 is associated with a delta value of three because the difference between the consumer energy demand of time slot 2 and the consumer energy demand of time slot 1=3−0=3. Similarly, the delta value of time slot 3 is derived as the difference in consumer energy demand of time slot 3 and the energy demand of preceding time slot 2=7−3=4; and the delta value of time slot 7 represents the difference in demand between slots 7 and 6=28−21=7.

At the conclusion of step 710, the system will have derived a delta stream of values that identifies changes in consumer demand for energy between each pair of time periods identified by adjacent time slots in the input stream.

In step 715, the system begins a process of defining a set of "slides" that each overlay a pair of sliding frames onto the delta stream. These slides are each represented by a row of a matrix or table 800, as shown in FIG. 8A. Each column of table 800 identifies a time slot of the desired time period and each row is a copy of the delta stream shown in Table I. The uppermost row is a header row that identifies the time slot that characterizes each column. FIG. 8B shows an analogous table 805, which consists of table 800 onto which the pairs of sliding frames have been overlaid. Each frame is represented by a boldfaced box that may extend through multiple time slots.

Each slide will be overlaid with a "match frame" and a "successor frame." Each of these frames encloses a set of horizontally adjacent cells and, in any distinct slide, the last cell of the match frame immediately precedes the first cell of the successor frame. For example, in slide 10 of FIG. 8B, a match frame encloses cells in columns 7-10 and a successor frame encloses cells in columns 11-14.

All match frames and successor frames have the same length L (that is, they enclose the same number of cells), although any frame that extends beyond the right or left boundary of its slide is truncated. Length L is set equal to the number of cells from the earliest delta value in table 805 (here, the cells in the column representing time slot 2) through the next occurring cell that contains the same delta value.

In table 805, the earliest (leftmost) delta value, at time slot 2, is 3, which represents a 3 megawatt change in consumer demand for energy between the first time slot and the second time slot. The next occurrence of a delta value=3 occurs in time slot 5. Four cells or time slots lie within the period of time between time slots 2 and 5, inclusive, indicating a frame length equal to four. Such a frame length indicates the smallest duration of time in which a repeating pattern of changes in energy demand can occur because it measures the smallest distance between two adjacent delta values.

As will be explained in the remaining steps of the method of FIG. 7 and illustrated in FIG. 8B, the system will analyze the delta stream to identify recurring patterns of delta values by shifting the match frame/successor frame pair one cell or time frame to the right in each successive slide.

Step 720 begins an iterative procedure of steps 720-730. The iterative procedure of steps 720-730 is performed once for each slide, or row, in table 805, and each iteration of steps 720-730 identifies a recurring pattern of delta values in that one slide. At the conclusion of the last iteration of steps 720-730, the system will have identified a set of recurring patterns of changes in energy demand that occurred during the time period of interest. These patterns will then be used by the system in steps 630-645 to select one or more energy suppliers to provide energy during the time period specified by the received request for power.

In step 725, the system positions match and successor frames on the slide being processed by the current iteration of steps 720-730.

In some embodiments, when a pattern is found under certain conditions, the frames are shifted a number of cells defined by length L, rather than shifting by one cell. An algorithmic expression of an embodiment of this shifting rule is:

(1a) BEGIN LOOP
(1b) IF $\forall j$, sf[1:j]=mf[L−j, L]; (a "pattern" sequence of j cells, starting at the first cell enclosed by the successor frame, matches a sequence of j cells starting at the first cell enclosed by the match frame)
(1c) THEN:
(1d) δ[j]=sf[1:j]; (shift frames by L cells; increment j by L)
(1e) ELSE, (shift frames by 1 cell; increment j by 1)
(1f) END LOOP when j=k−L
where:
mf[ ] is an array of cells enclosed by a match frame,
sf[ ] is an array of cells enclosed by a successor frame,
L is the length of (the number of cells enclosed by) either frame,
δ[ ] is the repeating pattern of cells in the current slide of the delta stream, and
k=the number of retrieved fulfilment blocks used to derive the delta stream.

During the first iteration of step 725, this procedure is initiated by positioning the successor frame on the first delta value, shown in table 805 as the value 3 located in time slot 2. As described above, the successor frame extends to the next occurrence of the same value, which in this example, occurs in time slot 5. The successor frame thus encloses time-slots or columns 2-5. Because the match frame has not yet been shifted onto the current slide, no recurring pattern can be identified during this first iteration.

The second iteration of step 725 evaluates the next row of table 805, which is labeled "Slide 2." Here, the successor frame shifts one column, cell, or time slot to the right, now enclosing slots 3-6. The match frame has likewise shifted one cell to the right, such that the rightmost cell of the match frame encloses time slot 2, which is adjacent to the leftmost cell of the successor frame.

The procedure of step 725 is performed for each successive delta-stream slide with each subsequent iteration of step 725. In the third iteration of the example of FIG. 8B, the match and successor frames shift another cell to the right, allowing two cells of the match frame to enclose time slots 2-3, and the successor frame to enclose slots 4-7.

Pairs of match and successor frames are overlaid in this manner onto each remaining slide of table 805. For example, in slide 8, the match and successor frames respectively enclose slots 5-8 and 9-12; in slide 9, the match and successor frames respectively enclose slots 6-9 and 10-13; and in slide 10, the match and successor frames respectively enclose slots 7-10 and 11-14.

In step 730, the system identifies recurring patterns of delta values in the current slide. This is performed by attempting to match a first subsequence of delta values, located within a range extending from the leftmost cell of the slide to the last cell of the match frame, with an identical second subsequence of delta values located within a range extending from the leftmost cell of the slide to the last cell of the successor frame.

For example, no match frame is overlaid on slide 1, so the slide cannot contain any first subsequence of delta values. There are thus no patterns for matching this slide and the system can identify no recurring patterns on slide 1. On slide 2, the match frame encloses the time slot 2 cell, which contains a delta value 3. This delta value recurs in the time slot 5 cell, which is a subset of the second subsequence. Therefore, the single value [3] is identified in this step as a recurring pattern.

Similarly, in slide 3, the two-cell match frame identifies a pattern [3, 4]. This pattern recurs in time slots 5 and 6, which are enclosed by the successor frame. Therefore, the system identifies delta pattern [3,4] as a second recurring pattern. In slide 4, the first subsequence identifies the pattern [3,4,7] which recurs in its entirety in slots 5-7 of the second subsequence The system therefore adds the pattern [3,4,7] to its growing list of delta patterns.

In the frame-enclosed cells of slides 7-9, the first-subsequence pattern [3,4,7] recurs twice. Here, the system may ignore a second identification of a previously identified pattern or, if desired by an implementer, may identify these recurrences as a pattern [(3,4,7)*2] (two instances of [3,4,7]). The system does not identify [3,4,7,3,4,7] as a recurring pattern because that entire 6-value pattern does not recur in its entirety without overlap. Similarly, the system does not identify [3,4,7,3] as a recurring pattern in slides 8 and 9 because the second subsequence does not comprise a distinct recurrence of the pattern [3,4,7,3], in its entirety and without overlap, in slides 8 and 9.

In slide 10, the first subsequence consists of the values [3,4,7,3,4,7,3,4,7]. The only subset of this subsequence that recurs in slide 10's second subsequence is the pattern [3,4,7], which occurs three times. The system thus adds the pattern [(3,4,7)*3] to its list of delta patterns.

In the example of FIG. 8B, remaining iterations of step 730 use similar logic to identify the patterns [(3,4,7)*3] and [4] in slide 11, patterns [(3,4,7)*3] and [(4)*2] in slides 12 and 13, and patterns [(3,4,7)*3] and [(4)*4] in slide 14.

When the last iteration of steps 720-730 has completed, the system will have identified patterns that include a sustained peak pattern of [(4)*4] (delta values of 4 that persist through four consecutive time periods) and a burst pattern of [3,4,7] (a pattern that leads up to a relatively large spike in demand). At the conclusion of the method of FIG. 7, the system will continue with step 630 of FIG. 6.

When selecting patterns for comparison in steps 630-640 of FIG. 6, certain embodiments of the system ignore any repeated sequences contained by a pattern. For example, if the method of FIG. 6 identified the patterns [1,2,3], [(1,2,3)*2], and [(1,2,3)*3], such an embodiment would consider only pattern [1,2,3] when determining supplier scores. Such embodiments would operate more efficiently by eliminating potentially redundant steps.

Examples and embodiments of the present invention described in this document have been presented for illustrative purposes. They should not be construed to be exhaustive nor to limit embodiments of the present invention to the examples and embodiments described here. Many other modifications and variations of the present invention that do not depart from the scope and spirit of these examples and embodiments will be apparent to those possessed of ordinary skill in the art. The terminology used in this document was chosen to best explain the principles underlying these examples and embodiments, in order to illustrate practical applications and technical improvements of the present invention over known technologies and products, and to enable readers of ordinary skill in the art to better understand the examples and embodiments disclosed here.

What is claimed is:

1. A power-distribution routing system comprising a processor, a memory coupled to the processor, and a computer-readable hardware storage device coupled to the processor, the storage device containing program code configured to be run by the processor via the memory to implement a method for using blockchain to select energy-generating sources, the method comprising:

the system receiving a request to route electrical power to users through a power-grid infrastructure during a future period of time;

the system retrieving time-stamped data from a blockchain-based distributed ledger;

the system directing an artificially intelligent cognitive framework to infer, as a function of the time-stamped blockchain data, one or more patterns in past rates of change of consumer demand;

the system ranking each candidate source of a set of power-generating sources as a function of that candidate source's demonstrated ability, as identified by the time-stamped data, to generate energy sufficient to fulfill consumer demand during occurrences of the patterns;

the system selecting an optimal mix of one or more of the candidate sources as a function of the ranking; and the system configuring downstream components to route energy from the optimal mix of sources through the infrastructure during the future period of time.

2. The system of claim 1, where the artificially intelligent cognitive framework infers the patterns by applying a sliding-frame mechanism to an array of past variations in consumer demand, where values of the array are derived from records of previous levels of consumer demand, and where the records of previous levels are mined from time-stamped data retrieved from the blockchain-based distributed ledger.

3. The system of claim 2, where the previous levels of consumer demand occurred during time periods that share characteristics with the future period of time.

4. The system of claim 1, where the time-stamped data comprises identifications of past fluctuations in energy demand, terms of service agreements and other contracts between energy companies, past fluctuations in energy-production capacities of the set of power-generating sources, and historic success rates of each power-generating source in fulfilling energy demand.

5. The system of claim 1, further comprising:
the system further retrieving extrinsic contextual socio-economic and contextual data from social media, other online reference sources, energy-company business records that detail operations of the power-grid infrastructure, and from asset-management and workforce management applications accessible to the power-transmission company; and
the system adjusting each candidate source's score as function of the contextual data.

6. The system of claim 1, where the configuring results in energy being routed to a power utility that in turn delivers the routed energy to energy consumers.

7. The system of claim 1, where the cognitive framework is trained through a machine-learning technology that trains the cognitive framework with training corpora that identify whether previously selected power-generating sources successfully fulfilled previous consumer demands.

8. A method for using blockchain to select energy-generating sources, the method comprising:
a power-distribution routing system receiving a request to route electrical power to users through a power-grid infrastructure during a future period of time;
the system retrieving time-stamped data from a blockchain-based distributed ledger;
the system directing an artificially intelligent cognitive framework to infer, as a function of the time-stamped blockchain data, one or more patterns in past rates of change of consumer demand;
the system ranking each candidate source of a set of power-generating sources as a function of that candidate source's demonstrated ability, as identified by the time-stamped data, to generate energy sufficient to fulfill consumer demand during occurrences of the patterns;
the system selecting an optimal mix of one or more of the candidate sources as a function of the ranking; and
the system configuring downstream components to route energy from the optimal mix of sources through the infrastructure during the future period of time.

9. The method of claim 8,
where the artificially intelligent cognitive framework infers the patterns by applying a sliding-frame mechanism to an array of past variations in consumer demand,
where values of the array are derived from records of previous levels of consumer demand, and
where the records of previous levels are mined from time-stamped data retrieved from the blockchain-based distributed ledger.

10. The method of claim 9,
where the previous levels of consumer demand occurred during time periods that share characteristics with the future period of time.

11. The method of claim 8, where the time-stamped data comprises identifications of past fluctuations in energy demand, terms of service agreements and other contracts between energy companies, past fluctuations in energy-production capacities of the set of power-generating sources, and historic success rates of each power-generating source in fulfilling energy demand.

12. The method of claim 8, further comprising:
the system further retrieving extrinsic contextual socio-economic and contextual data from social media, other online reference sources, energy-company business records that detail operations of the power-grid infrastructure, and from asset-management and workforce management applications accessible to the power-transmission company; and
the system adjusting each candidate source's score as function of the contextual data.

13. The method of claim 8, where the cognitive framework is trained through a machine-learning technology that trains the cognitive framework with training corpora that identify whether previously selected power-generating sources successfully fulfilled previous consumer demands.

14. The method of claim 8, further comprising providing at least one support service for at least one of creating, integrating, hosting, maintaining, and deploying computer-readable program code in the computer system, wherein the computer-readable program code in combination with the computer system is configured to implement the receiving, the retrieving, the directing, the ranking, the selecting, and the configuring.

15. A computer program product, comprising a first computer-readable storage medium having a computer-readable program code stored therein, the program code configured to be executed by a power-distribution routing system comprising a processor, a memory coupled to the processor, and a second computer-readable storage medium coupled to the processor,
the program code configured to be run by the processor via the memory to implement a method for using blockchain to select energy-generating sources, the method comprising:
a power-distribution routing system receiving a request to route electrical power to users through a power-grid infrastructure during a future period of time;
the system retrieving time-stamped data from a blockchain-based distributed ledger;
the system directing an artificially intelligent cognitive framework to infer, as a function of the time-stamped blockchain data, one or more patterns in past rates of change of consumer demand;
the system ranking each candidate source of a set of power-generating sources as a function of that candidate source's demonstrated ability, as identified by the time-stamped data, to generate energy sufficient to fulfill consumer demand during occurrences of the patterns;
the system selecting an optimal mix of one or more of the candidate sources as a function of the ranking; and
the system configuring downstream components to route energy from the optimal mix of sources through the infrastructure during the future period of time.

16. The computer program product of claim 15,
where the artificially intelligent cognitive framework infers the patterns by applying a sliding-frame mechanism to an array of past variations in consumer demand,
where values of the array are derived from records of previous levels of consumer demand, and
where the records of previous levels are mined from time-stamped data retrieved from the blockchain-based distributed ledger.

17. The computer program product of claim 16,
where the previous levels of consumer demand occurred during time periods that share characteristics with the future period of time.

18. The computer program product of claim 15, where the time-stamped data comprises identifications of past fluctuations in energy demand, terms of service agreements and other contracts between energy companies, past fluctuations in energy-production capacities of the set of power-generating sources, and historic success rates of each power-generating source in fulfilling energy demand.

19. The computer program product of claim 15, further comprising:
- the system further retrieving extrinsic contextual socio-economic and contextual data from social media, other online reference sources, energy-company business records that detail operations of the power-grid infrastructure, and from asset-management and workforce management applications accessible to the power-transmission company; and
- the system adjusting each candidate source's score as function of the contextual data.

20. The computer program product of claim 15, where the cognitive framework is trained through a machine-learning technology that trains the cognitive framework with training corpora that identify whether previously selected power-generating sources successfully fulfilled previous consumer demands.

* * * * *